US012543877B2

(12) United States Patent
Lurie et al.

(10) Patent No.: US 12,543,877 B2
(45) Date of Patent: Feb. 10, 2026

(54) PORTABLE EQUIPMENT STAND

(71) Applicant: WOBIG LLC, Lafayette, CA (US)

(72) Inventors: Marc Lurie, Lafayette, CA (US); Tim Wobig, Lafayette, CA (US); Patrick Burgess, Lafayette, CA (US)

(73) Assignee: WOBIG LLC, Lafayette, CA (US)

( * ) Notice: Subject to any disclaimer, the term of this patent is extended or adjusted under 35 U.S.C. 154(b) by 60 days.

(21) Appl. No.: 18/236,762

(22) Filed: Aug. 22, 2023

(65) Prior Publication Data

US 2024/0057800 A1  Feb. 22, 2024

Related U.S. Application Data

(60) Provisional application No. 63/399,903, filed on Aug. 22, 2022.

(51) Int. Cl.
A47G 25/40 (2006.01)
F16M 11/24 (2006.01)

(52) U.S. Cl.
CPC .......... A47G 25/40 (2013.01); F16M 11/242 (2013.01); F16M 2200/06 (2013.01)

(58) Field of Classification Search
CPC .. A47G 25/40; A47G 25/0671; F16M 11/242; F16M 2200/06; F16M 2200/065; F16M 11/046; F16M 11/38; F16M 13/00; F16M 13/022
USPC .............................................. 248/163.1, 166
See application file for complete search history.

(56) References Cited

U.S. PATENT DOCUMENTS

| | | | | |
|---|---|---|---|---|
| 863,820 | A * | 8/1907 | Wingert | A47G 25/0671 223/90 |
| 4,852,836 | A * | 8/1989 | Kawazoe | F16M 13/00 248/188.8 |
| 5,520,360 | A * | 5/1996 | Wensman | F16M 11/046 248/188.5 |
| 5,772,162 | A * | 6/1998 | Lin | A61M 5/1415 248/125.1 |
| 5,876,011 | A * | 3/1999 | Blasing | F16M 11/046 403/109.1 |
| 6,007,032 | A * | 12/1999 | Kuo | F16M 11/16 248/188.7 |
| 6,216,887 | B1 * | 4/2001 | Soo | A47G 25/0671 211/205 |
| 6,276,087 | B1 * | 8/2001 | Singletary | F16M 11/28 42/94 |

(Continued)

Primary Examiner — Muhammad Ijaz
(74) Attorney, Agent, or Firm — K&L Gates LLP

(57) ABSTRACT

A portable equipment stand to hold tactical equipment, protective equipment, and/or uniforms is disclosed. An example portable equipment stand includes a central frame, three legs hingedly connected to a first end of the central frame, two arms hingedly connected to a second end of the central frame, and a neck located at the second end of the central frame. The legs are rotatable between a first retracted position and a first deployed position. The two arms are located on opposing sides of the central frame and are rotatable between a second retracted position and a second deployed position. The neck is configured to move from a third retracted position to a third deployed position. The arms are configured to enclose at least a bottom portion of the legs when the arms are in the second retracted position and the legs are in the first retracted position.

19 Claims, 4 Drawing Sheets

(56) References Cited

U.S. PATENT DOCUMENTS

| | | | | |
|---|---|---|---|---|
| 6,450,464 | B1 * | 9/2002 | Thomas | F16M 11/046 248/431 |
| 6,575,422 | B1 * | 6/2003 | Zheng | F16M 11/242 108/118 |
| 6,585,199 | B1 * | 7/2003 | Yu | F16M 11/16 248/163.1 |
| 6,899,441 | B2 * | 5/2005 | Chen | F21L 13/08 362/249.02 |
| 7,011,280 | B2 * | 3/2006 | Murray | G01C 15/002 396/419 |
| 7,273,198 | B2 * | 9/2007 | Tourtellotte | E04H 12/2238 248/166 |
| 7,291,775 | B2 * | 11/2007 | Yu | G10G 5/00 248/443 |
| 7,762,504 | B2 * | 7/2010 | Chih | F16M 11/10 248/161 |
| 8,322,666 | B2 * | 12/2012 | Duemmel | A47G 23/0208 248/163.1 |
| 8,393,482 | B2 * | 3/2013 | Durham | D06F 59/02 248/163.1 |
| 9,298,066 | B1 * | 3/2016 | Fan | F16M 11/242 |
| 9,635,966 | B1 * | 5/2017 | Procaccini | A47G 25/0671 |
| 9,833,099 | B1 * | 12/2017 | Ring | A47G 33/10 |
| 9,989,836 | B1 * | 6/2018 | Riddel | F16M 13/00 |
| D822,092 | S * | 7/2018 | Bergman | F16M 11/041 D16/244 |
| 10,690,304 | B2 * | 6/2020 | Adams | F21V 21/22 |
| D986,461 | S * | 5/2023 | Fang | D26/63 |
| 2007/0246619 | A1 * | 10/2007 | Chih | F16M 11/10 248/166 |
| 2009/0071922 | A1 * | 3/2009 | Barra | F16M 11/046 211/85.3 |
| 2013/0152828 | A1 * | 6/2013 | Chavira | F16M 11/26 108/12 |
| 2015/0083678 | A1 * | 3/2015 | Baughman | A47F 5/04 211/85.3 |
| 2020/0217452 | A1 * | 7/2020 | Shan | F16M 11/28 |
| 2020/0233285 | A1 * | 7/2020 | Hansen | G03B 17/561 |
| 2021/0080049 | A1 * | 3/2021 | He | F16M 11/28 |
| 2021/0132203 | A1 * | 5/2021 | Lai | F16M 11/42 |
| 2021/0285595 | A1 * | 9/2021 | Pao | F16M 11/38 |
| 2022/0137490 | A1 * | 5/2022 | Lord | A45F 4/00 396/419 |
| 2022/0412504 | A1 * | 12/2022 | Liu | G01M 17/00 |
| 2024/0084927 | A1 * | 3/2024 | Boldt | B25H 1/04 |

* cited by examiner

PORTABLE EQUIPMENT STAND

PRIORITY CLAIM

This application claims priority to and the benefit as a non-provisional application of U.S. Provisional Patent Application No. 63/399,903 filed Aug. 22, 2022, the entire contents of which are hereby incorporated by reference and relied upon.

BACKGROUND

A soldier carries and maintains anywhere from fifty to two hundred pounds of tactical equipment. The equipment can include boots, heavy-duty pants, a heavy-duty coat, helmet, fire arm, ammunition, knife, etc. Oftentimes, the soldier places their equipment on the ground when it is not being carried. Placing equipment on the ground enables moisture and debris to potentially contaminate the equipment. If the solider is in a barracks, the solider may resort to hanging their equipment off of bed frames or laying their equipment on the floor. However, this option is not preferred since it generally leaves the barracks looking disorganized and it is easy for the equipment to be knocked to the floor and damaged. A need accordingly exists for a portable equipment stand that can be used during deployments in the barracks and in the field.

SUMMARY

A portable equipment stand is disclosed herein. The portable equipment stand is configured to hold tactical equipment, protective equipment, and/or uniforms for a soldier or other individual. To enable portability, the portable equipment stand includes arms, legs, and a neck that are configured to retract relative to a central frame to form a cylindrical shape that can be easily held, worn, or carried. In this retracted position, the portable equipment stand may have a diameter between one inch and four inches and a length between twelve inches and thirty six inches.

In a deployed configuration, the arms and the legs of the portable equipment stand rotate outward from the central frame. Additionally, the neck extends upward from the central frame. When deployed, the portable equipment stand is configured to have a height between twenty four inches and sixty inches off the ground and support hundreds of pounds of tactical equipment, protective equipment, and/or uniforms.

In light of the disclosure set forth herein, and without limiting the disclosure in any way, in a first aspect of the present disclosure, which may be combined with any other aspect, or portion thereof, described herein a portable equipment stand includes a central frame having a cylindrical shape, three legs hingedly connected to a first end of the central frame, two arms hingedly connected to a second end of the central frame, and a neck located at the second end of the central frame. The legs are rotatable between a first retracted position and a first deployed position. The two arms are located on opposing sides of the central frame and are rotatable between a second retracted position and a second deployed position. Additionally, the neck is configured to move from a third retracted position to a third deployed position. The arms are configured to enclose at least a bottom portion of the at least three legs when the arms are in the second retracted position and the legs are in the first retracted position.

In a second aspect of the present disclosure, which may be combined with any other aspect, or portion thereof, described herein, the portable equipment stand further includes central frame magnets configured to align with respective magnets on each of the arms. Magnetic coupling between the central frame magnets and the respective magnets on each of the arms causes the two arms to be held in place in the second retracted position.

In a third aspect of the present disclosure, which may be combined with any other aspect, or portion thereof, described herein, the portable equipment stand further includes a cap connected to a first end of the neck and a neck lock connected to a second end of the neck. Rotation of the cap in a first direction causes the neck lock to release from an inside of the central frame, thereby enabling the neck to move between the third retracted position and the third deployed position. Additionally, rotation of the cap in an opposite, second direction causes the neck lock to tighten against the inside of the central frame, thereby preventing the neck from moving between the third retracted position and the third deployed position.

In a fourth aspect of the present disclosure, which may be combined with any other aspect, or portion thereof, described herein, the portable equipment stand further includes an arm locking mechanism located at the second end of the neck. The arm locking mechanism is configured to prevent each of the arms from rotating after being moved to the second deployed position when the neck is moved to the third deployed position.

In a fifth aspect of the present disclosure, which may be combined with any other aspect, or portion thereof, described herein, the neck lock includes the arm locking mechanism.

In a sixth aspect of the present disclosure, which may be combined with any other aspect, or portion thereof, described herein, movement of the neck from the third deployed position to the third retracted position disables the arm locking mechanism, thereby enabling the arms to rotate between the second deployed position and the second retracted position.

In a seventh aspect of the present disclosure, which may be combined with any other aspect, or portion thereof, described herein, the portable equipment stand further includes a locking spring mechanism configured to prevent each of the legs from rotating after being moved to the deployed position.

In an eighth aspect of the present disclosure, which may be combined with any other aspect, or portion thereof, described herein, the portable equipment stand further includes an actuator located at the first end of the central frame and connected to the locking spring mechanism. The actuator is configured to release the locking spring mechanism to enable the legs to be rotated to the retracted position.

In a ninth aspect of the present disclosure, which may be combined with any other aspect, or portion thereof, described herein, the portable equipment stand further includes interleaved gearing connected to each of the legs at the first end of the central frame. The interleaved gearing causes the legs to synchronously rotate between the deployed position and the retracted position.

In a tenth aspect of the present disclosure, which may be combined with any other aspect, or portion thereof, described herein, a surface curvature around a longitudinal axis of each of the legs is configured to form a cylindrical shape when the legs are rotated to the retracted position.

In an eleventh aspect of the present disclosure, which may be combined with any other aspect, or portion thereof, described herein, a surface curvature around a longitudinal axis of each of the arms is configured to form a cylindrical shape when the arms are rotated to the retracted position.

In a twelfth aspect of the present disclosure, which may be combined with any other aspect, or portion thereof, described herein, the portable equipment stand has a cylindrical shape when the legs, the arms, and the neck are in the respective retracted positions.

In a thirteenth aspect of the present disclosure, which may be combined with any other aspect, or portion thereof, described herein, each of the legs is configured to rotate between 110 degrees and 165 degrees with respect to the central frame to form a tripod when the legs are rotated to the first deployed position.

In a fourteenth aspect of the present disclosure, which may be combined with any other aspect, or portion thereof, described herein, each of the legs are tapered between 20% and 80% of their length between a wide section and a narrow section, the wide section being adjacent to the first end of the central frame.

In a fifteenth aspect of the present disclosure, which may be combined with any other aspect, or portion thereof, described herein, the arms are configured to enclose the narrow section of each of the legs when the arms and the legs are rotated to the respective retracted positions.

In a sixteenth aspect of the present disclosure, which may be combined with any other aspect, or portion thereof, described herein, the portable equipment stand is configured to have a height between two feet and five feet when the arms, the legs, and the neck are in the respective deployed positions.

In a seventeenth aspect of the present disclosure, which may be combined with any other aspect, or portion thereof, described herein, a portable equipment stand includes a central frame, legs hingedly connected to a first end of the central frame, arms hingedly connected to a second end of the central frame, and neck located at the second end of the central frame. The legs are rotatable between a first retracted position and a first deployed position. The arms are rotatable between a second retracted position and a second deployed position. Additionally, the neck is configured to move from a third retracted position to a third deployed position. The arms are configured to enclose at least a bottom portion of the legs when the arms are in the second retracted position and the legs are in the first retracted position.

In an eighteenth aspect of the present disclosure, which may be combined with any other aspect, or portion thereof, described herein, the legs include at least two legs and the arms include at least two arms.

In a nineteenth aspect of the present disclosure, which may be combined with any other aspect, or portion thereof, described herein, the legs include at least three legs and the arms include at least two arms.

In a twentieth aspect of the present disclosure, which may be combined with any other aspect, or portion thereof, described herein, the portable equipment stand has a cylindrical shape when the legs, the arms, and the neck are in the respective retracted positions.

In a twenty-first aspect, any of the features, functionality and alternatives described in connection with any one or more of FIGS. 1 to 4 may be combined with any of the features, functionality and alternatives described in connection with any other of FIGS. 1 to 4.

In light of the present disclosure and the above aspects, it is therefore an advantage of the present disclosure to provide a portable equipment stand that can retract into a portable cylindrical shape.

It is another advantage of the present disclosure to provide a portable equipment stand that can silently deploy arms, legs, and a neck to hold tactical equipment, protective equipment, and/or uniforms.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

A portable equipment stand is disclosed herein. The portable equipment stand is relatively lightweight and can be easily carried in the field. The portable equipment stand may be used by soldiers for hanging military gear. Alternatively, the portable equipment stand may be used by first responders for hanging protective equipment, gear, and/or uniforms. The portable equipment stand may also be configured for civilian use including camping, hiking, skiing, etc.

Figure 1:
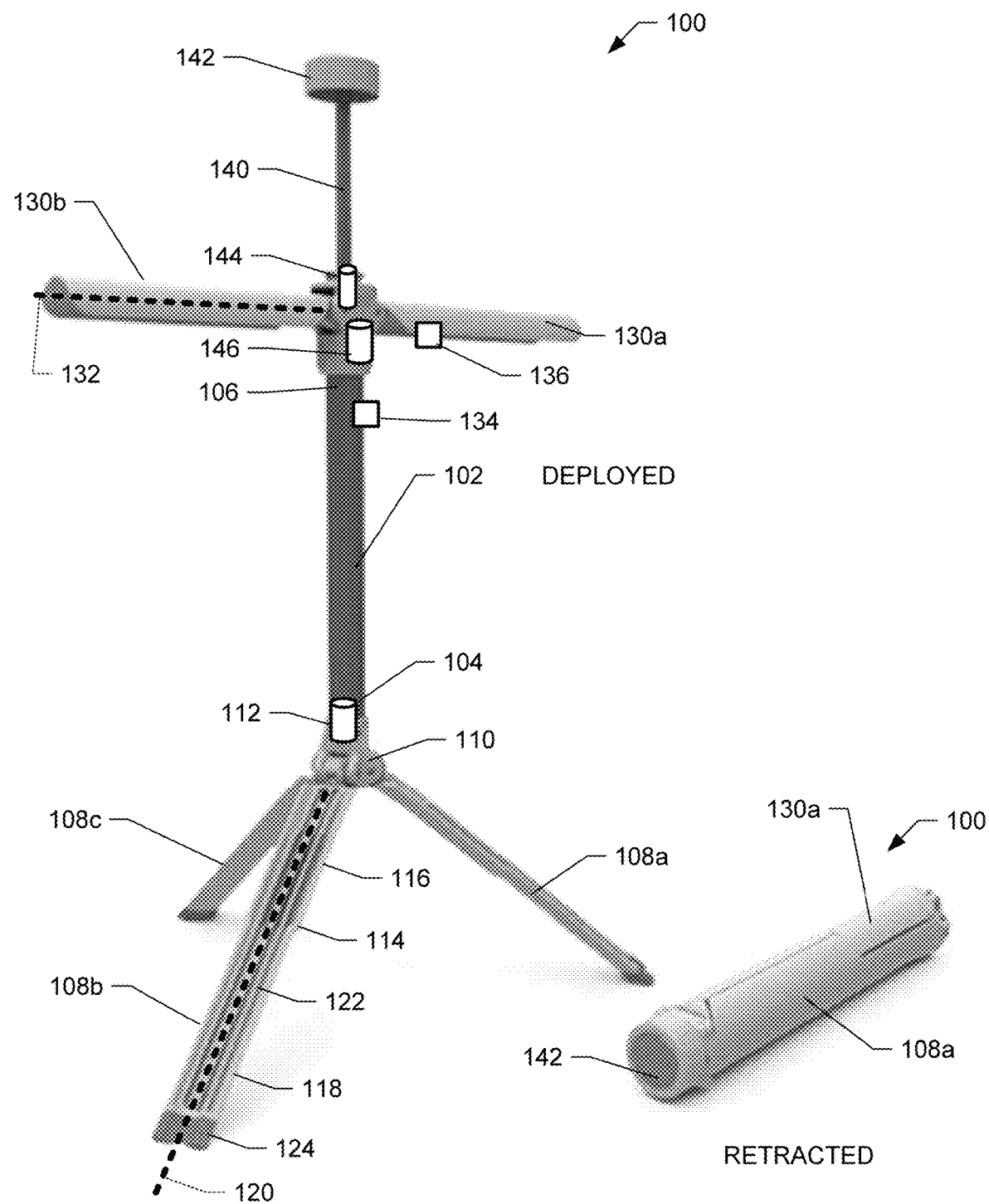
FIG. 1 is a view of a portable equipment stand in a deployed configuration and a retracted configuration, according to an example embodiment of the present disclosure.

FIG. 1 is a diagram of a portable equipment stand 100 in a deployed position and a retracted position, according to an example embodiment of the present disclosure. In the retracted position, the portable equipment stand 100 has a cylindrical shape, which enables it to be carried easily. As shown in the retracted position, the portable equipment stand 100 may have a diameter between one inch and four inches and a length between twelve inches and forty-eight inches.

As shown in the deployed position, the potable equipment stand 100 has a central frame 102, which may include a cylindrical rod. The central frame 100 may be hollow. Further, the central frame 102 may be made from stainless steel, aluminum, iron, carbon fiber, plastic, and/or plastic composites to form a structural core.

The central frame 102 includes a first end 104 and a second end 106. At least two legs 108 are hingedly connected to the central frame 102. In the illustrated example, the central frame 102 is connected to three legs 108a, 108b, and 108c. In other embodiments, the central frame 102 is connected to two legs, four legs, five legs, etc.

Figure 2:
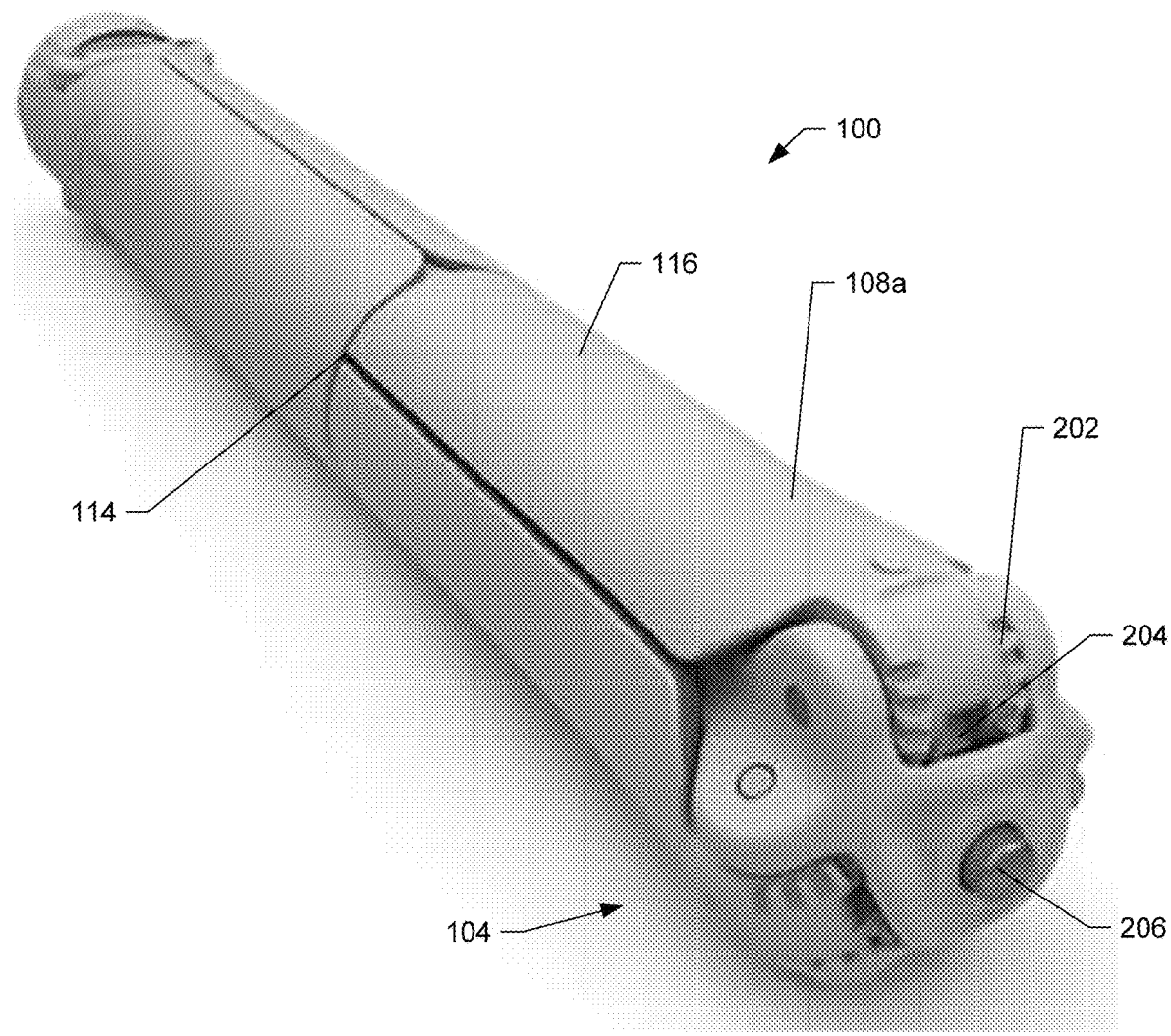
FIGS. 2 and 3 are views of the portable equipment stand in the retracted configuration, according to an example embodiment of the present disclosure.

The legs 108 are connected to the central frame 102 at respective hinges 110, which may include pivot points, rotation joints, etc. Each hinge 110 is configured to enable the respective leg 108 to rotate between, for example, 110 degrees and 165 degrees with respect to the central frame 102, thereby forming a tripod. In some embodiments, each of the hinges 110 includes interleaved gearing. The interleaved gearing causes the legs to synchronously rotate between the deployed position and the retracted position. FIG. 2 shows a view of the potable equipment stand 100 in which gear teeth 202 of the legs 108 are visible. The gear teeth 202 are configured to engage the interleaved gearing of the hinge 110 to enable the legs 108 to rotate together. In alternative embodiments, the interleaved gearing is omitted such that the legs may be rotated separately.

The portable equipment stand 100 may include a locking spring mechanism 112 that is configured to prevent each of the legs 108 from rotating after being moved to the deployed position. FIG. 2 shows a recess section 204 that is located between parallel rows of the gear teeth 202 for one of the legs 108a. When the leg 108a is rotated to the deployed position, the recess section 204 engages a tab of the locking spring mechanism 112. Once engaged, the tab of the locking spring mechanism 112 prevents the leg 108a from rotating out of the deployed position. The tabs may comprise a three-sided block. To unlock the legs 108, the portable equipment stand 100 includes an actuator 206, which may include a button or switch. When pressed, the actuator 206 is configured to compress a spring of the locking spring mechanism 112, which causes the tabs of the locking spring mechanism 112 to be pulled inward from the respective recess sections 204 of the legs 108, thereby releasing the locking spring mechanism 112. Without the tabs preventing rotation, the legs 108 may be freely rotated between the deployed and the retracted positions. As shown in FIG. 2, the actuator 206 is located at the first end 104 of the central frame 102. In some embodiments, the legs 108 may be spring-biased such that when the actuator 206 is pressed, a spring pulls the legs 108 to the retracted position.

Returning to FIG. 1, each of the legs 108 may include a taper 114 between which the leg 108 transitions from a wide section 116 to a narrow section 118. As shown, the taper 114 may be located on a single side of the leg 108. Alternatively, the taper 114 may be located on both sides of the leg 108. In the illustrated example, the taper 114 is located such that the narrow section 118 comprises about 60% of the length of the leg 108. In other embodiments depending on a length of the leg 108 and/or the central frame 102, the taper 114 may be positioned such that the narrow section 118 comprises between 20% to 80% of the length of the leg 108. As shown in FIG. 2, the narrow section 118 of the leg 108 is enclosed by arms 130 when the legs 108 and the arms 130 are in respective retracted positions. The wide section 116 of the legs 108, when rotated to the retracted position, is configured to create a cylindrical profile that has a similar diameter as the arms 130, when the arms 130 are also rotated to the retracted position.

As shown in FIG. 1, each of the legs 108 also includes a surface curvature around a longitudinal axis 120 that forms a cylindrical shape when the legs 108 are rotated to the retracted position. The arms 130 also include a surface curvature around a longitudinal axis 132 that forms a cylindrical shape when the arms 130 are rotated to their retracted position. In the illustrated example, since the portable equipment stand 100 includes two arms 130 and three legs 108, the arms 130 have a curvature of 180° to form a cylinder while the three legs 108 each have a curvature of 120°. Further, since the arms 130 are configured to enclose the narrow section 118 of the legs 108, the arms 130 have a deeper curvature compared to the legs 108, which only enclose the central frame 102. Moreover, as shown in FIG. 1, the legs 108 may each include one or more ribs 122 that provide structural support.

In some embodiments, an end of each leg 108 includes a foot 124. The example foot 124 may be made of rubber or other relatively soft material that provides at least some friction with a relatively smooth surface, such as a floor or a table top to prevent the portable equipment stand 100 from sliding. Additionally, the foot 124 may reduce rattling from the arms 130 contacting the legs 108 when they are in the retracted positions. In some instances, the foot 124 includes a recess section that engages a tab located at the end of the respective foot 108. In other instances, the foot 124 maybe integrally formed with the leg 108.

As shown in FIG. 1, the portable equipment stand 100 includes the two arms 130a and 130b. In other embodiments, the portable equipment stand 100 may include three or more arms. The example arms 130 are configured to support equipment, gear, and/or clothing. In the deployed position, the arms 130 are rotated 90° from the central frame 102. In other examples, the arms 130 may be rotated between 60° and 140° from the central frame 102. In some embodiments, the rotation of the arms 130 may be adjustable based on a desired user preference.

To keep the arms 130 in the retracted position, the portable equipment stand 100 includes central frame magnets 134. In the illustrated example, only a single central frame magnet 134 is shown. However, a central frame magnet may be provided on the central frame 102 for each arm. In the illustrated example, the central frame magnet 134 is located about one to three inches from the second end 106 of the central frame 102. In other examples, the central frame magnet 134 may be located further away from the second end 106 toward a center of the central frame 102. Further, two or more central frame magnets 134 may be provided along the central frame 102 for each arm 130. The central frame magnet 134 may be located on an outside surface of the central frame 102, inside of the central frame 102, or integrally formed with the central frame 102.

Each of the arms 130 includes an arm magnet 136 that magnetically couples respectively with the central frame magnet 134 when the arm 130 is rotated to the retracted position. The arm magnet 136 is located on an underside of the arm 130 and is positioned along a length of the arm 130 to align with the respective central frame magnet 134. The magnetic coupling between the arm magnet 136 and the central frame magnet 134 is configured to hold the respective arm 130 in the retracted position.

Similar to the legs 108, the arms 130 may include gear teeth that couple with interleaved gearing that is located within the second end 106 of the central frame 102. The interleaved gearing enables synchronized rotation of the arms 130 between the deployed and the retracted positions. In some embodiments, the interleaved gearing is omitted such that the arms 130 may be rotated separately.

The portable equipment stand 100 also includes a neck 140 connected to the second end 106 of the central frame 102. The neck 140 includes a cylindrical rod that has a diameter that is smaller than a diameter of the central frame 102. The neck 140 may be moved between a retracted position and a deployed position by being pulled upward from the central frame 102. A cap 142 is connected to a first end of the neck 140 to enable the neck 140 to be easily pulled upward. Additionally, a wider diameter of the cap 142 compared to the neck 140 enables gear (e.g., a helmet) to be hung more easily.

A neck lock 144 is connected to a second end of the neck 140. The cap 142 may be rotated, causing the neck 140 and the neck lock 144 to rotate. Rotation of the cap 142 in a first direction causes the neck lock 144 to release from an inside of the central frame 102, thereby enabling the neck 140 to move between the retracted position and the deployed position. Rotation of the cap 142 in an opposite, second direction causes the neck lock 144 to tighten against the inside of the central frame 102, thereby preventing the neck 140 from moving between the retracted position and the deployed position.

To hold the arms 130 in the deployed position, the second end of the neck 140 and/or the second end 106 of the central frame 102 may include an arm locking mechanism 146. The example arm locking mechanism 146 may include the neck lock 144 in some instances. The arm locking mechanism 146 may be similar to the locking spring mechanism 112. For instance, each of the arms 130 may include a recessed section between gear teeth. The recessed section is configured to receive a tab from the arm locking mechanism 146, when engaged. The insertion of the tab within the recessed section of the arm 130 prevents the arm from rotating.

The arm locking mechanism 146 may be engaged when the neck 140 is pulled upward to the deployed position. The upward movement of the neck 140 pulls the arm locking mechanism 146 upward into alignment with the ends of the arms 130. After being engaged, the arms 130 are locked into position when the respective recessed sections engage the tabs on the arm locking mechanism 146. To release or disable the lock, the neck 140 is lowered, thereby removing the tabs of the arm locking mechanism 146 from the recessed sections of the arms 130, thereby enabling the arms to freely rotate.

In some embodiments, the neck lock 144 and/or the arm locking mechanism 146 includes a spring that encircles at least a portion of the neck 140. Pulling the neck to the deployed position causes the spring to compress. The spring accordingly restricts the pull of the neck 140 to the deployed position, which creates tension during deployment. When the cap 142 is rotated to release the neck lock 140, the spring pulls the neck 140 into the central frame 102, thereby releasing the arms 130 to freely rotate.

Figure 3:
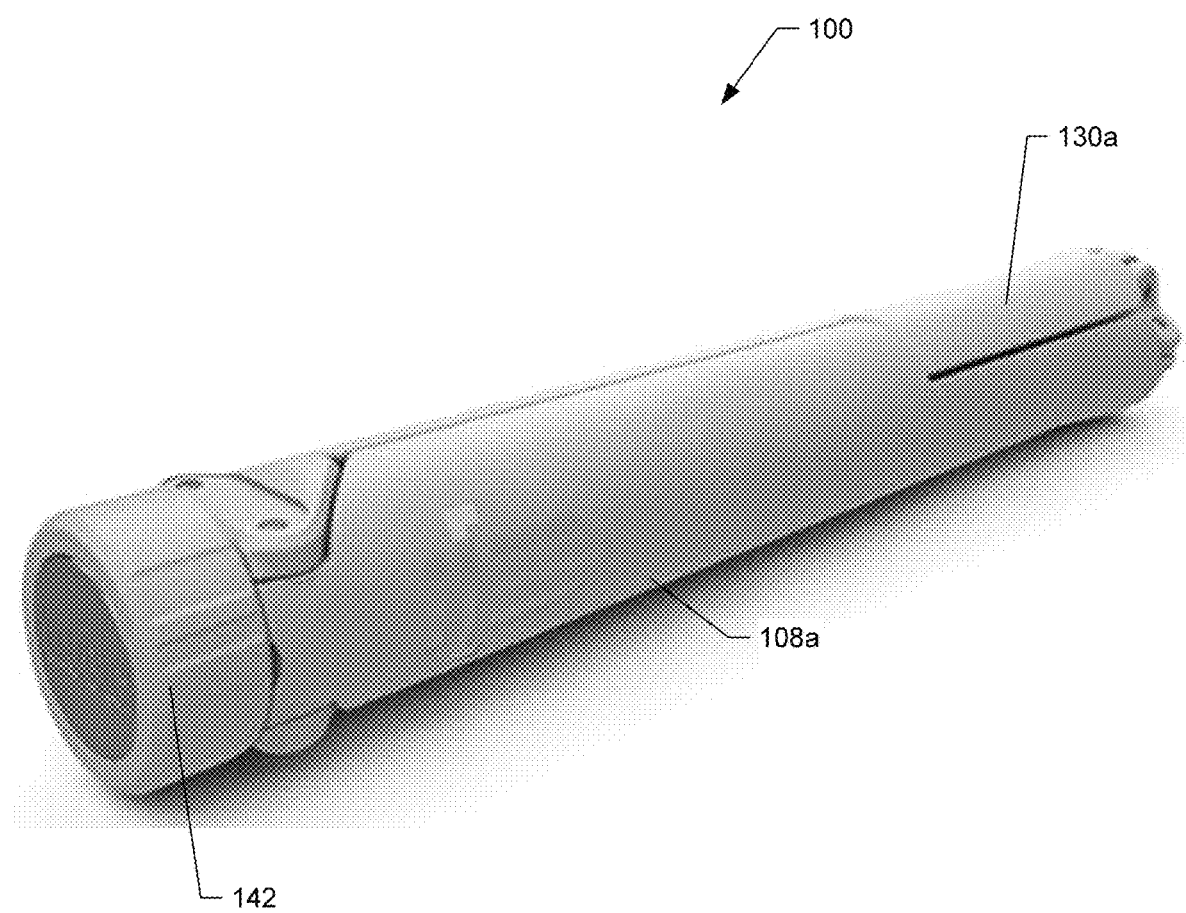
Figure 4:
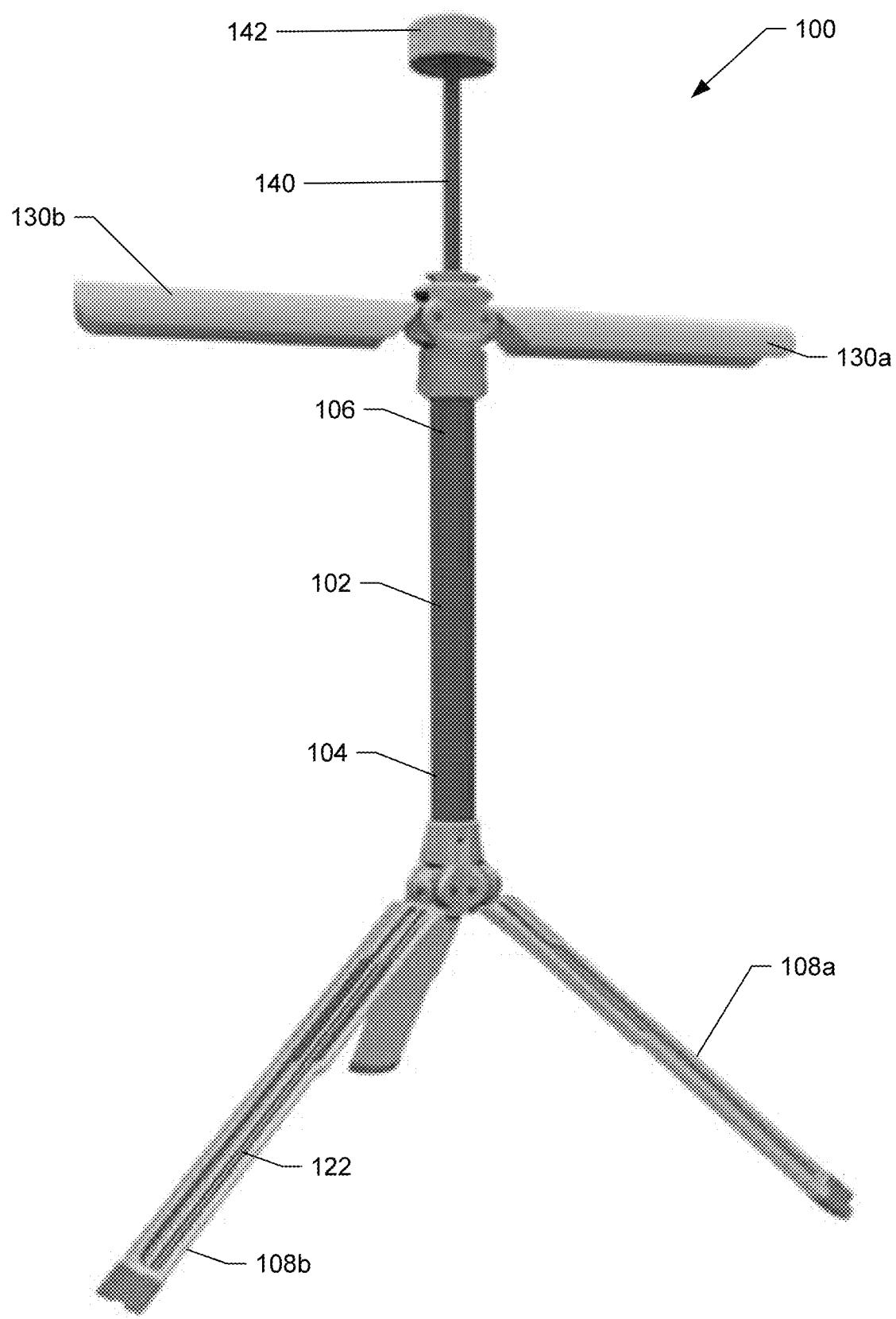
FIG. 4 is a view of a portable equipment stand in the deployed configuration, according to an example embodiment of the present disclosure

FIG. 3 shows the portable equipment stand 100 in the retracted position while FIG. 4 shows the portable equipment stand 100 in the deployed position. To go from the retracted position to the deployed position, the cap 142 is first rotated to release the neck lock 144. The cap 142 is then pulled upward, causing the neck 140 to be pulled from the central frame 102 to the deployed position. The cap 142 is then rotated in an opposite direction, thereby reengaging the neck lock 144 and preventing the neck 140 from being pulled back into the central frame 102. Next, the arms 130 are rotated upward to the deployed position. Rotation of the arms 130 breaks the magnetic coupling with the central frame 102. The arms 130 engage with the arm locking mechanism 146 and are thereby restricted from rotating. The legs 130 are then rotated downward and locked into place via the locking spring mechanism 112. At this point, the portable equipment stand 100 can hold equipment, gear, clothing, etc.

To stow, the actuator 206 is pressed, thereby releasing the locking spring mechanism 112. Once released, the legs 108 are rotated to the deployed position. The cap 142 is rotated to release the neck lock 144. This release enables the neck 140 to be pulled into the central frame 102. The cap 142 is then rotated in an opposite direction, thereby reengaging the neck lock 144 to prevent the neck 140 from inadvertently extending from the central frame 102. After the neck 140 is lowered, the arm locking mechanism 146 is disengaged from the arms 130, thereby enabling the arms 130 to be rotated downward to the retracted position. As shown in FIG. 3 the arms 130 enclose at least a portion of the legs 108 to form a cylindrical shape.

It should be appreciated that while the above disclosure has the arms 130 enclose the legs 130, in other embodiments, the legs may enclose the arms. In these embodiments, the arms 130 are rotated first to the retracted position. The legs are then rotated to enclose the arms.

Further, while the portable equipment apparatus 100 is shown as a cylinder in the retracted position, in other embodiments, the portable equipment apparatus 100 may have a cuboid shape. In this example, the legs may form sides of the cuboid. Further, the arms may each include two sides of the cuboid. Alternatively, each arm may be a side of the cuboid such that four arms are used.

CONCLUSION

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A portable equipment stand comprising:
a central frame having a cylindrical shape;
three legs hingedly connected to a first end of the central frame, the three legs being rotable between a first retracted position and a first deployed position;
two arms hingedly connected to a second end of the central frame, the two arms located on opposing sides of the central frame and being rotable between a second retracted position and a second deployed position;
a neck located at the second end of the central frame, the neck configured to move from a third retracted position to a third deployed position; and
interleaved gearing connected to each of the three legs at the first end of the central frame, the interleaved gearing causing the three legs to synchronously rotate between the first deployed position and the first retracted position,
wherein the two arms are configured to enclose at least a bottom portion of the three legs when the two arms are in the second retracted position and the three legs are in the first retracted position.

2. The portable equipment stand of claim 1, further comprising central frame magnets configured to align with respective magnets on each of the two arms, magnetic coupling between the central frame magnets and the respective magnets on each of the two arms causing the two arms to be held in place in the second retracted position.

3. A portable equipment stand comprising:
a central frame having a cylindrical shape;
three legs hingedly connected to a first end of the central frame, the three legs being rotable between a first retracted position and a first deployed position;
two arms hingedly connected to a second end of the central frame, the two arms located on opposing sides of the central frame and being rotable between a second retracted position and a second deployed position;

a neck located at the second end of the central frame, the neck configured to move from a third retracted position to a third deployed position;

a cap connected to a first end of the neck; and a neck lock connected to a second end of the neck, wherein the two arms are configured to enclose at least a bottom portion of the three legs when the two arms are in the second retracted position and the three legs are in the first retracted position, wherein rotation of the cap in a first direction causes the neck lock to release from an inside of the central frame, thereby enabling the neck to move between the third retracted position and the third deployed position, and wherein rotation of the cap in an opposite, second direction causes the neck lock to tighten against inside of the central frame, thereby preventing the neck from moving between the third retracted position and the third deployed position.

4. The portable equipment stand of claim 3, further comprising an arm locking mechanism located at the second end of the neck, the arm locking mechanism configured to prevent each of the two arms from rotating after being moved to the second deployed position when the neck is moved to the third deployed position.

5. The portable equipment stand of claim 4, wherein the neck lock includes the arm locking mechanism.

6. The portable equipment stand of claim 4, wherein movement of the neck from the third deployed position to the third retracted position disables the arm locking mechanism, thereby enabling the two arms to rotate between the second deployed position and the second retracted position.

7. The portable equipment stand of claim 1, further comprising a locking spring mechanism configured to prevent each of the three legs from rotating after being moved to the first deployed position.

8. The portable equipment stand of claim 7, further comprising an actuator located at the first end of the central frame and connected to the locking spring mechanism, the actuator configured to release the locking spring mechanism to enable the three legs to be rotated to the first retracted position.

9. The portable equipment stand of claim 1, wherein a surface curvature around a longitudinal axis of each of the three legs is configured to form a cylindrical shape when the three legs are rotated to the first retracted position.

10. The portable equipment stand of claim 1, wherein a surface curvature around a longitudinal axis of each of the two arms is configured to form a cylindrical shape when the two arms are rotated to the second retracted position.

11. The portable equipment stand of claim 1, wherein the portable equipment stand has a cylindrical shape when the three legs, the two arms, and the neck are in the respected retracted positions.

12. The portable equipment stand of claim 1, wherein each of the three legs is configured to rotate between 110 degrees and 165 degrees with respect to the central frame to form a tripod when the three legs are rotated to the first deployed position.

13. The portable equipment stand of claim 1, which is configured to have a height between two feet and five feet when the two arms, the three legs, and the neck are in the respective deployed positions.

14. A portable equipment stand comprising:

a central frame having a cylindrical shape;

three legs hingedly connected to a first end of the central frame, the three legs being rotable between a first retracted position and a first deployed position;

two arms hingedly connected to a second end of the central frame, the two arms located on opposing sides of the central frame and being rotable between a second retracted position and a second deployed position; and a neck located at the second end of the central frame, the neck configured to move from a third retracted position to a third deployed position, wherein the two arms are configured to enclose at least a bottom portion of the three legs when the two arms are in the second retracted position and the three legs are in the first retracted position, wherein each of the three legs is tapered between 20% and 80% of their length between a wide section and a narrow section, the wide section being adjacent to the first end of the central frame.

15. The portable equipment stand of claim 14, wherein the two arms are configured to enclose the narrow section of each of the three legs when the two arms and the three legs are rotated to the respective retracted positions.

16. A portable equipment stand comprising:

a central frame;

legs hingedly connected to a first end of the central frame, the legs being rotable between a first retracted position and a first deployed position;

arms hingedly connected to a second end of the central frame, the arms being rotable between a second retracted position and a second deployed position; and a neck located at the second end of the central frame, the neck configured to move from a third retracted position to a third deployed position, wherein the arms are configured to enclose at least a bottom portion of the legs when the arms are in the second retracted position and the legs are in the first retracted position.

17. The portable equipment stand of claim 16, wherein the legs include at least two legs and the arms include at least two arms.

18. The portable equipment stand of claim 16, wherein the legs include at least three legs and the arms include at least two arms.

19. The portable equipment stand of claim 16, wherein the portable equipment stand has a cylindrical shape when the legs, the arms, and the neck are in the respective retracted positions.

* * * * *